Inventors:
William W. Piper,
Peter D. Johnson,
by Paul A. Frank
Their Attorney.

United States Patent Office 2,721,950
Patented Oct. 25, 1955

---

2,721,950

ELECTROLUMINESCENT CELL

William W. Piper and Peter D. Johnson, Schenectady, N. Y., assignors to General Electric Company, a corporation of New York Application August 9, 1952, Serial No. 303,566

14 Claims. (Cl. 313—108)

This invention relates to an electroluminescent cell; more particularly, it relates to an electroluminescent cell using zinc fluoride as a luminescent material.

In an electroluminescent cell light is obtained from a phosphor placed in an electric field. In an electroluminescent cell of this type, a metal plate serving as an electrode is coated with a thin layer of phosphor which is in turn coated with a thin layer of dielectric material having a second electrode in contact with the surface thereof. If desired, the phosphor may be suspended in the dielectric layer. This type of cell is frequently made with a transparent electrode surface prepared by forming a thin layer of conducting tin oxide on glass which then has formed on it an overlying layer of phosphor or phosphor embedded in a dielectric substance. The other electrode may then comprise a reflecting surface which will enhance the intensity of the light passing from the cell through the transparent electrode.

In Piper application Serial No. 274,237, filed February 29, 1952, and assigned to the same assignee as the present application, an electroluminescent cell consisting of a single crystal of zinc sulfide is disclosed. The present invention discloses a luminescent substance satisfactory for use either as a single crystal cell or a cell using a polycrystalline phosphor.

It is an object of this invention to provide an electroluminescent cell having enhanced brightness characteristics.

It is another object of the invention to provide an electroluminescent cell having an efficient phosphor which emits light of superior intensity characteristics.

Briefly stated, in accordance with one of its aspects, this invention comprises an electroluminescent cell composed of a layer of zinc fluoride, or a crystalline zinc fluoride, having electrodes disposed on opposite surfaces thereof.

Figure 1:
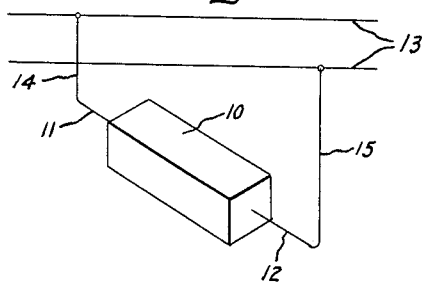
Figure 2:
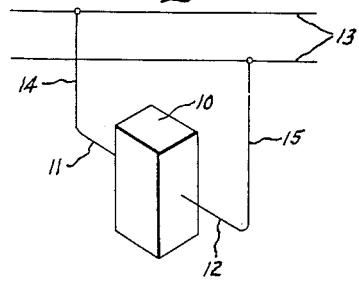
Figure 3:
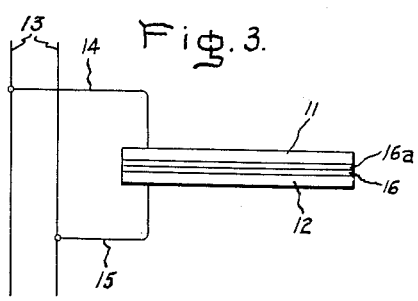
Figure 4:
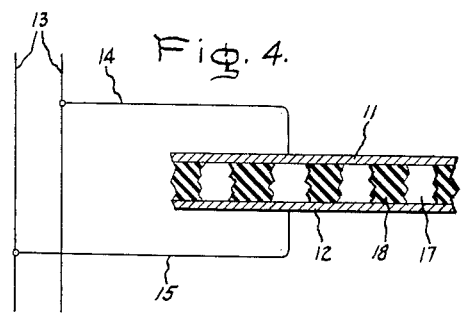
Figure 5:
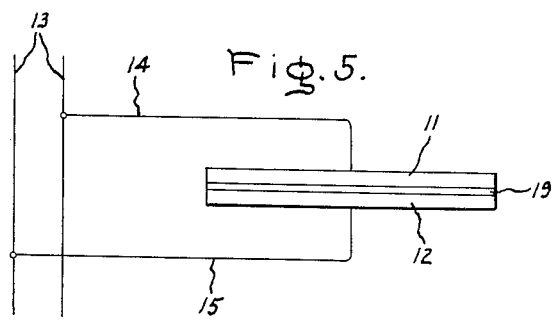

In the drawing, Fig. 1 illustrates an electroluminescent cell composed of a single crystal of zinc fluoride. Fig. 2 shows an electroluminescent cell similar to Fig. 1 except that the electrodes are positioned on a different set of crystal faces. Fig. 3 shows a conventional electroluminescent cell incorporating zinc fluoride as the luminescent substance. Fig. 4 shows an electroluminescent cell utilizing a plurality of single crystals. Fig. 5 shows an electroluminescent cell utilizing a layer of polycrystalline material.

Referring to Figs. 1 and 2, a single crystal 10, shown in enlarged form, has a pair of electrodes 11 and 12 connected on separate faces of the crystal. The electrodes 11 and 12 may be connected to an opaque conducting substance such as silver paste or a smooth surfaced metal plate or metallic probes on the crystal faces; or, in certain cases, one or both of the electrodes may be connected to a transparent conducting layer such as a glass-backed layer of conducting tin oxide on the crystal faces. The electrodes 11 and 12 are connected by means of conductors 14 and 15 to a source of electrical energy 13 which, in the case of Figs. 1, 2, 4 and 5 may be either alternating or direct. Zinc fluoride is self-activating to some extent, and therefore a crystal 10 of pure zinc fluoride will emit light when subjected to an electric field. However, the brightness of the emitted light is enhanced if a small quantity of activator, such as manganese, thallium, cerium, or lead, is present in the crystal. We prefer to use manganese for this purpose and prefer to have it present to an extent of less than 10% by weight. Quantities up to 25% may be used but they confer no benefit upon the zinc fluoride. A preferred range of activator is 1% to 6%.

The cells illustrated in Figs. 3, 4 and 5 have a much larger luminescent surface than the cells of Figs. 1 and 2. The electrode 12 may be composed of a metal plate or it may be composed of glass or similar transparent substance having a conducting layer of tin oxide formed on the surface thereof. A layer of phosphor 16 (Fig. 3) is in contact with the conducting surface of the electrode 12. The layer 16 is preferably composed of zinc fluoride powder. Overlying the layer 16 is a thin film 16a of dielectric material which may be composed of any of a large variety of plastics, resins and inorganic films ($SiO_2$ etc.). For example, the layer 16a may be composed of cellulose nitrate, polyacrylic acid, polyvinyl chloride, cellulose acetate, alkyd resins, and other transparent dielectric materials to which may be added modifying substances such as camphor, glycerine, tricresylphosphate, and similar materials. Optionally, the layer 16a may be omitted if the phosphor layer 16 is in a form other than zinc fluoride powder. If the layer 16 is composed of zinc fluoride powder, it may be suspended in a dielectric in which event a separate dielectric layer 16a may be omitted. The electrodes 11 and 12 of Fig. 3 are connected to a source of electrical energy 13 through the conductors 14 and 15 in the same manner as illustrated for Figs. 1 and 2.

In Fig. 4, the cell has a number of single crystals 17 separated by a dielectric 18. In Fig. 5, the cell has a phosphor 19 composed of activated polycrystalline material or transparent layer.

In preparing crystalline zinc fluoride in accordance with our invention, we place zinc fluoride powder to which has been added from 1% to 5% of ammonium fluoride and up to 10% activator in a platinum crucible. The crucible has a tight-fitting cover applied to it after which it is heated over a Bunsen burner. After the zinc fluoride mixture is heated to fusion, the gas supply of the burner is gradually decreased over a period of about one hour. This treatment results in the production of clear transparent crystals of zinc fluoride near the upper outside edge of the melt. Crystals produced by this method may be utilized singly or in combination in electroluminescent cells.

A transparent film of zinc fluoride may be applied to a conducting base by heating either the unfired or the crystallized zinc fluoride in a vacuum chamber and condensing the evaporated phosphor on the conducting surface. An activator may be incorporated either by including it in the mix or by co-vaporizing it from a separate source. An alternative method of applying a transparent film of zinc fluoride to a conducting base is to react zinc chloride and ammonium fluoride in the vapor phase to condense zinc fluoride upon the base.

Electroluminescent cells known to the prior art have been capable of producing light of such a low order of brightness that the cells have been useful only in apparatus where light of a low order was sufficient. An electroluminescent cell provided with a zinc fluoride phosphor in accordance with this invention will give off light of about 5 times the brightness of the cells of the prior art using a zinc sulfide oxide phosphor under the same conditions of voltage and frequency.

While the present invention has been described with reference to particular embodiments thereof, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. An electroluminescent cell comprising a crystal of zinc fluoride activated with 1 to 6% by weight of an activator selected from the group consisting of manganese, thallium, cerium and lead, and a pair of electrodes oppositely disposed on said crystal.

2. An electroluminescent cell comprising a single crystal of zinc fluoride containing 1 to 6% by weight of manganese, and a pair of electrodes oppositely disposed on said crystal.

3. An electroluminescent cell comprising a crystal of zinc fluoride cocrystallized with 1 to 6% by weight of an activator selected from the group consisting of manganese, thallium, cerium, and lead, and a pair of electrodes oppositely disposed on said crystal.

4. An electroluminescent cell comprising a crystal of zinc fluoride cocrystallized with 1 to 6% of manganese as an activator, and a pair of electrodes disposed on separate portions of said crystal.

5. An electroluminescent cell comprising a plurality of zinc fluoride single crystals activated with 1 to 6% by weight of an activator selected from the group consisting of manganese, thallium, cerium and lead, said crystals being positioned to form a layer of crystalline material, and a pair of electrodes connected to opposite sides of said layer.

6. The method of fabricating an electroluminescent cell which comprises heating a batch of zinc fluoride together with 1 to 6% by weight of an activator selected from the group consisting of manganese, thallium, cerium and lead to fusion temperature, cooling said batch of zinc fluoride slowly, separating a transparent zinc fluoride crystal from said batch, and connecting a pair of electrodes to separate portions of said crystal.

7. An electroluminescent cell comprising a transparent phosphor layer comprising crystalline zinc fluoride activated with 1 to 6% by weight of manganese zinc fluoride, a layer of transparent dielectric material overlying at least a part of one surface of said layer of zinc fluoride, an electrode connected to the other surface of said zinc fluoride, and a transparent electrode connected to the exposed surface of said dielectric material.

8. An electroluminescent cell comprising a phophor layer comprising crystalline zinc fluoride activated with 1 to 6% by weight of an activator selected from the group consisting of manganese, thallium, cerium and lead and a pair of electrodes connected to opposite sides of said layer.

9. The electroluminescent cell of claim 8 in which the activator is manganese.

10. An electroluminescent cell comprising a transparent phosphor layer comprising crystalline zinc fluoride cocrystallized from a vapor phase with 1 to 6% by weight of an activator selected from the group consisting of manganese, thallium, cerium and lead, and a pair of electrodes connected to opposite surfaces of said phosphor layer.

11. The electroluminescent cell of claim 10 in which the activator is manganese.

12. The method of fabricating an electroluminescent cell which comprises heating a batch of zinc fluoride together with 1 to 6% by weight of manganese to fusion temperature, cooling said batch of zinc fluoride slowly, separating a transparent zinc fluoride crystal from said batch and connecting a pair of electrodes to separate portions of said crystal.

13. The method of fabricating an electroluminescent cell which comprises melting a batch of zinc fluoride together with 1 to 6% by weight of manganese and 1 to 5% by weight of ammonium fluoride, cooling said batch slowly to allow crystals to form, separating a transparent zinc fluoride crystal from said batch and connecting a pair of electrodes to separate portions of said crystal.

14. An electroluminescent cell comprising a crystal of zinc fluoride activated with 1 to 6% by weight of manganese and a pair of electrodes oppositely disposed on said crystal.

References Cited in the file of this patent

UNITED STATES PATENTS

| | | |
|---|---|---|
| 2,558,532 | Banco | June 26, 1951 |
| 2,566,349 | Mager | Sept. 4, 1951 |
| 2,624,857 | Mager | Jan. 6, 1953 |

OTHER REFERENCES

G. Destrian: New Phenomenon of Electrophotoluminescence—Philosophical Mag., October 1947—vol. 38, pp. 700–702, 711–713, 723, especially pp. 711 and 713.